(No Model.)
G. N. DE LORICA & F. W. WILDER.
FRICTION CLUTCH.
No. 534,862. Patented Feb. 26, 1895.
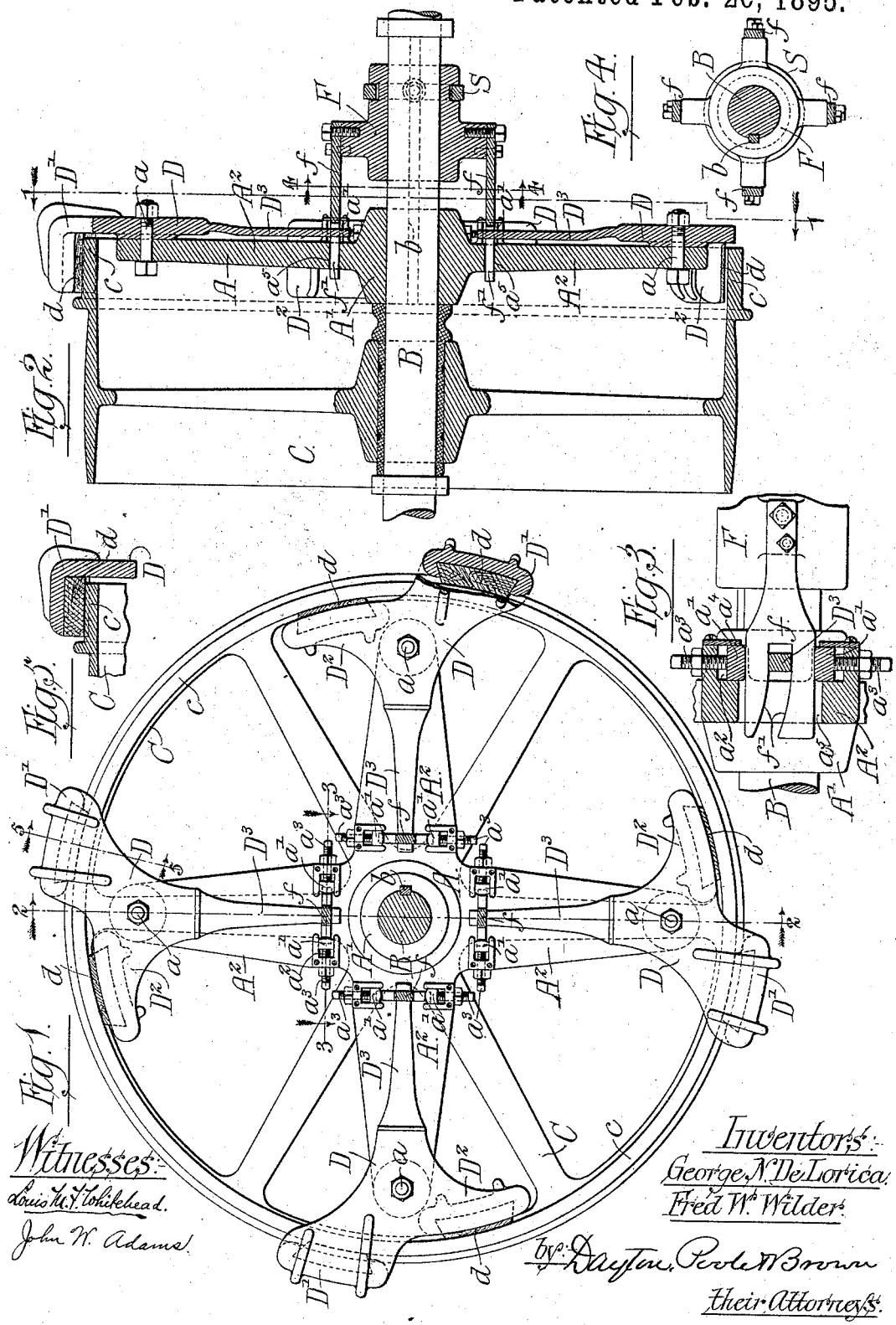
Witnesses:
Louis M. Lockhead.
John W. Adams.
Inventors:
George N. De Lorica
Fred W. Wilder
by Dayton, Poole & Brown
their Attorneys.

UNITED STATES PATENT OFFICE.

GEORGE N. DE LORICA AND FRED W. WILDER, OF CHICAGO, ILLINOIS.

FRICTION-CLUTCH.

SPECIFICATION forming part of Letters Patent No. 534,862, dated February 26, 1895.

Application filed March 7, 1894. Serial No. 502,651. (No model.)

*To all whom it may concern:*

Be it known that we, GEORGE N. DE LORICA and FRED W. WILDER, of Chicago, in the county of Cook and State of Illinois, have invented certain new and useful Improvements in Friction-Clutches; and we do hereby declare that the following is a full, clear, and exact description thereof, reference being had to the accompanying drawings, and to the letters of reference marked thereon, which form a part of this specification.

This invention relates to friction clutches of that class in which radially movable, and revoluble jaws are made to grasp a cylindric rim of a pulley or other revoluble part, concentric with the path of the jaws, for the purpose of transmitting motion and power from one member of the device to the other.

A primary object of the invention is to provide a construction by which the jaws may be made to grip the rim with greater force than they do in clutches heretofore made and may be given such greater efficiency with the exertion of no greater hand power than is ordinarily available for throwing the clutch into engagement.

To this end the invention consists in the matters hereinafter set forth and pointed out in the hereto appended claim.

In the accompanying drawings which illustrate one embodiment of the invention, the clutch proper is shown to be of the four-arm variety.

Figure 1 is a side elevation of the clutch, with the driving shaft and operating bars in section on line 1—1 of Fig. 2. Fig. 2 is a longitudinal section thereof taken on line 2—2 of Fig. 1. Figs. 3, 4 and 5 are detail sections taken on lines 3—3, 4—4 and 5—5 respectively of Figs. 1 and 2.

A designates the jaw-carrying frame or spider of the clutch, rigidly secured at its hub A' upon a driving shaft B by means of a key b or otherwise, and C is a pulley or other member loosely rotatable on said shaft adjacent to the spider and provided with the cylindric rim c. From the hub A' the arms A² radiate at uniform intervals in the usual manner, and at the outer end of each of said arms an oscillating lever D is pivoted at a point midway between its ends upon a pivot pin a arranged parallel with the shaft B. The opposite ends of each of said levers D are formed with lateral projections or shoes D' D² arranged to bear frictionally one upon the outer and the other upon the inner surface of the pulley rim c at points near the pivot a.

As a means by which the levers D may be oscillated to throw the shoes D' and D² into and out of engagement with the rim c, they are herein shown as being each provided with an integral arm D³ which extends radially inward to within a short distance of the hub A'. To vibrate these arms the usual sliding collar F, mounted on the shaft B to rotate therewith, is provided with cam bars f arranged parallel with the shaft B and having sliding bearing upon the arms of the spider and also upon the lever arms D³. Preferably said arms f haves traight, parallel sides for sliding engagement with the spider and curved or inclined cam slots f' within which the ends of the arms D³ are confined, said slots being so shaped that as the collar F is moved on the shaft B toward the spider A the arm D³ will be oscillated to throw the shoes D' and D² into engagement with the flange c, and vice versa; but said cam bars, instead of bearing at both sides upon the spider and having slots which bear at both sides upon the lever arms, may bear at one side only upon the spider and at the other upon the lever arms, thus acting as wedges between the two to throw the clutch shoes into engagement with the rim. Disengagement may in that case be effected by springs applied to the shoe levers or by excess of centrifugal force of the outer shoes or by any other suitable means.

To support the cam bars f laterally, adjustable guide blocks a' are desirably mounted on the spider arms A² to bear upon the said bars, and in this instance said guide blocks are movably mounted within suitable recesses a² and combined with adjusting screws a³ by means of which the blocks may be set in or out, as desired. By these means the parts may be adjusted to secure exactly simultaneous engagement of the several shoes D' and D² with the rim c and any wear of the surfaces may be compensated. Removable plates a⁴ in this instance prevent the displacement of the blocks a', and recesses a⁵ in the arms A² permit the free longitudinal movement of the bars $f$ while supporting them against radial deflection.

The cam surfaces of the slots $f'$ may have their sides parallel or substantially parallel with the outer edges of the bars for a portion of their length and in those parts thereof which engage the lever arms when the clutch shoes are in bearing upon the rim $c$, so that said bars will automatically retain the position given them and hold the clutch in action, while the inclination of the cam surfaces and the leverage afforded by the arms of the shoe levers, may be such that relatively little force applied to slide the collar F will cause the shoes to grip the pulley rim with great power or will retain them from such engagement.

The necessary sliding movement of the collar F may be given it by the usual shipper S or other suitable means.

The shoes $D'$ $D^2$ are shown as being provided with removable wearing blocks $d$ $d$ of wood or other suitable material of familiar form, but they may be of any suitable construction. Preferably also the spider arms $A^2$ are made short enough to permit of the spider being located within the rim $c$, thereby reducing the length of the clutch on the shaft and securing a more compact arrangement thereof.

It is, of course, immaterial which member of the clutch is fast and which is loose upon the shaft B.

We claim as our invention—

The combination, with a rotative part provided with a cylindric flange, of a concentric, rotative spider, oscillating levers pivoted thereto, said levers being each provided at opposite ends with friction shoes adapted to engage, one with the inner and the other with the outer surface of said flange, inwardly extending, rigid arms on each of said levers, a sliding collar mounted concentrically to rotate with said spider and movable toward and from the same, bars secured to said collar and provided at their free ends with cam surfaces engaging the inner ends of the lever arms, and adjustable guides mounted in the frame and engaging the sides of the bars, substantially as described.

In testimony that we claim the foregoing as our invention we affix our signatures in presence of two witnesses.

GEORGE N. DE LORICA.
FRED W. WILDER.

Witnesses:
M. E. DAYTON,
HENRY W. CARTER.